United States Patent [19]
Reese

[11] 3,814,354
[45] June 4, 1974

[54] LANDING WHEEL ROTATING DEVICE FOR AIRCRAFT
[75] Inventor: Lewis E. Reese, Phoenix, Ariz.
[73] Assignee: Oldrich Drake, Phoenix, Ariz.
[22] Filed: May 14, 1973
[21] Appl. No.: 359,906

[52] U.S. Cl. ............................................ 244/103 S
[51] Int. Cl. ............................................ B64c 25/40
[58] Field of Search......... 244/103 S, 103 R, 104 R, 244/102 R, 100 R, 50; 180/1 P, 7 P

[56] References Cited
UNITED STATES PATENTS
2,072,277  3/1937  Pogue ..................... 244/103 S UX
3,233,849  2/1966  Rubin ........................... 244/103 S Primary Examiner—George E. A. Halvosa
Assistant Examiner—Paul E. Sauberer
Attorney, Agent, or Firm—Warren F. B. Lindsley

[57] ABSTRACT

A power operated device associated with the conventional landing gear of an aircraft for causing rotation of the landing wheels of the aircraft by the air-stream moving past the aircraft prior to landing and while still airborne.

18 Claims, 6 Drawing Figures

LANDING WHEEL ROTATING DEVICE FOR AIRCRAFT

BACKGROUND OF THE INVENTION

This invention relates to power operated devices which may be associated with the landing gear of an aircraft which will automatically function to cause initial and continued rotation of its landing wheels when the landing gear is exposed to the air pressure or airstream created by the swiftly moving aircraft during a landing operation and while still airborne.

1. Field of the Invention

This invention is particularly directed to an air powered landing wheel rotating device which, when associated with the landing gear of an aircraft, will automatically cause initial and continued rotation of the landing wheels whenever the aircraft is airborne and the landing gear is exposed to the airstream, and which will cease rotating of the landing wheels upon their contact with the runway.

2. Description of the Prior Art

Apparatus for causing initial and continued rotation of the landing wheels of an aircraft, previous to and during the landing approach have been devised, installed and tested on various types of aircraft. Most of these systems required the use of heavy component parts which added undesirable weight to the landing gear of the aircraft and utilized the aircraft's batteries as their source of power necessitating expensive recharging and frequent replacement of these batteries.

SUMMARY OF THE INVENTION

In accordance with the present invention, a new and improved landing wheel rotating device for aircraft is provided which is comparatively light in weight, inexpensive to produce and install in the conventional landing gear of a modern aircraft, and which requires little or no attention on the part of the aircraft's crew or maintenance personnel to perform its function after its initial installation.

The landing wheel rotating device of this invention includes a fan, impeller, or other form of air pressure driven element for suppling the necessary power for activating a lightweight gear train. The gear train is associated through a pair of suitable slip-clutches with the axles which drive the landing wheels upon exposure of the landing gear to the airstream created by the swiftly moving aircraft. The claimed device provides automatic disassociation of the rotating landing wheels from the motive force, including the fan and the drivetrain upon touch-down and self-rotation of the wheels on the runway by the aircraft.

It is, therefore, an object of this invention to provide an improved landing wheel rotating device for aircraft.

Another object of this invention is to provide an inexpensive, lightweight landing wheel rotating device which may be easily installed and utilized in association with the conventional landing gear of modern aircraft.

A further object of this invention is to provide an improved landing wheel rotating device which will automatically function to cause initial and continued rotation of the landing wheels of an aircraft upon exposure of said wheels to the airstream created by the swiftly moving aircraft when still airborne.

A still further object of this invention is to provide a landing wheel rotating device for aircraft having means for automatically connecting or disconnecting the landing wheels from their air powered motive force, whenever a differential in the rotational speed of said wheels and said motive force is encountered.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which.

DESCRIPTION OF THE PREFERRED EMBODIMENT

It is well known that extreme punishment is imposed on the tires of aircraft upon their impact with the surface of the runway during landing. The increase in their speed of rotation upon frictional contact with the runway during landing and the subsequent braking action required for a heavy commercial type aircraft is severe and dangerous often resulting in tire blowouts and the attendant damage to the plane and injury to its occupants.

Because of the above facts and the use of up to 16 tires for the several landing gear arrangements of commercial and military aircraft, which are expensive to replace and require a great amount of scrutiny and maintenance between flights to insure the safety of the plane and its passengers, it is believed that the claimed landing wheel rotating device would increase the safety and tire life of those aircrafts. The simple expedient of causing the wheels and tires of the aircraft to be rotated before and at touch-down when landing lessens the force of the impact and the resulting damage to the tires.

Figure 1:
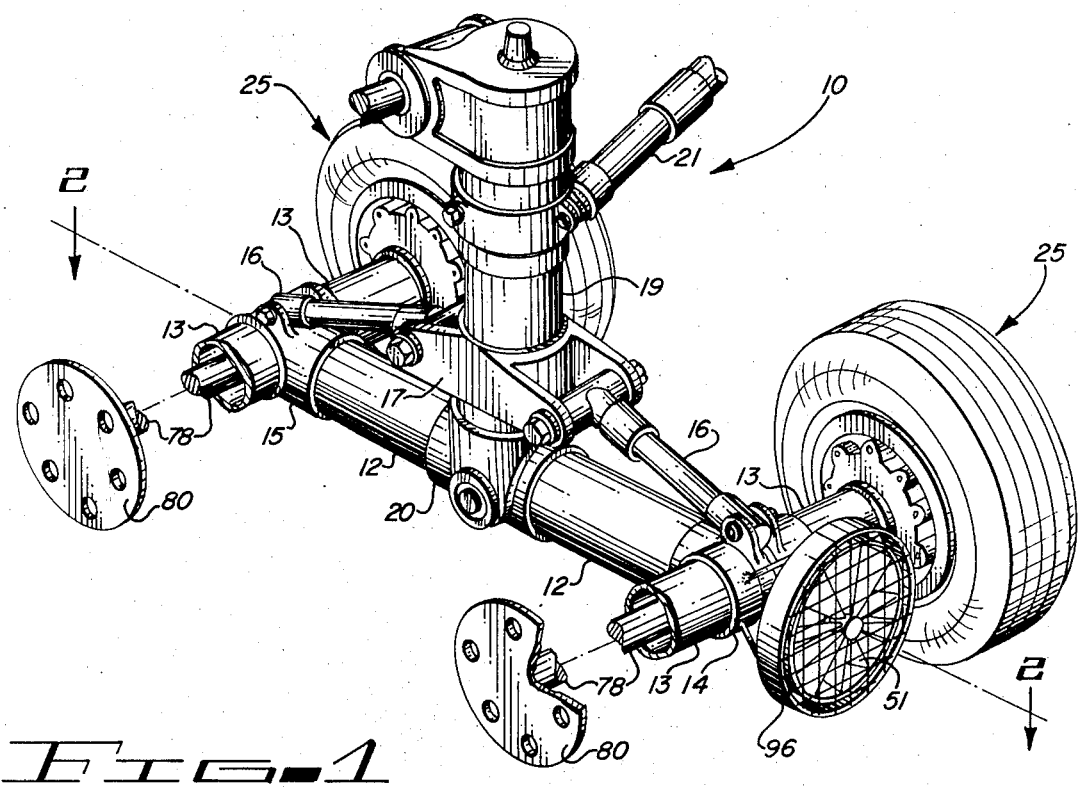
FIG. 1 is a perspective view of one of the landing gear assemblies of a commercial type aircraft, showing some of the components of the landing wheel rotating device of this invention associated therewith.

Referring more particularly to the drawings by characters of reference, FIG. 1 illustrates one unit of a landing gear assembly 10 commonly used on heavy, high speed commercial or military aircraft. Several of such units are usually required for landing purposes on aircraft of this type. Since these units are usually similar in design and construction, only one unit has been shown in FIG. 1 with the landing wheel rotating device of this invention incorporated therein.

The landing gear assembly 10 comprises a truck beam or frame 11 usually constructed in the shape or form of the letter "I" and formed of several tubular members which include the longitudinal member 12 and the transverse members 13. Members 13 are rigidly joined at their front and rear intersections by T-shaped members 14 and 15 in any suitable manner. The T-shaped members 14 and 15 are provided with upstanding brackets which pivotally support one end of the telescoping leveling links 16, the other ends of which are pivotally supported in the projecting extensions of a bracket 17 which is integral with a collar 18 which surrounds the tubular, perpendicular shock strut housing 19. Housing 19 is centrally located, supported on, and pivotally attached to the longitudinal member 12 of the truck beam 11 by means of a collar 20, as shown in FIG. 1. The shock strut housing 19 is fitted with the usual side braces 21 and other components of the elevating mechanism (not shown) for raising or lowering the landing gear assembly 10 into or out of its respective well or enclosure in the fuselage or wings of the aircraft.

Figure 4:
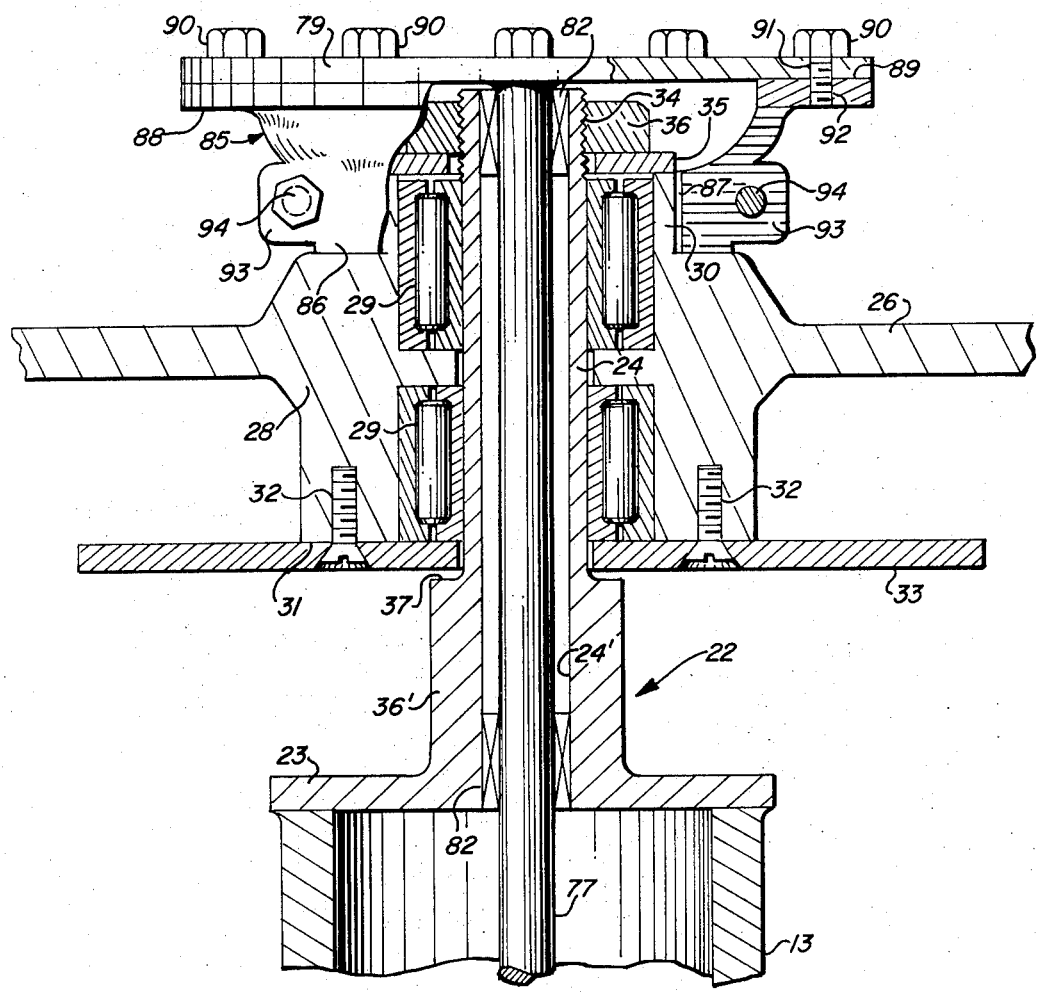
FIG. 4 is an enlarged fragmentary horizontal sectional view taken in the area indicated by the "circle 4" in FIG. 2, showing the relationship of the aircraft landing wheel to some of the elements of the invention.

The transverse members 13 extend outwardly from the front and rear T-shaped members 14 and 15 and each is provided, as illustrated in FIG. 4, at its outer ends with a wheel hub 22 having an integral circular flange portion 23 rigidly secured thereto and a smaller diameter integral tubular hub extension 24 about which the landing gears, wheels and tire assemblies 25 including wheels 26 and tires 27 are adapted to rotate.

Wheels 26 are provided with the usual hub portions 28 which are journaled on suitable roller or ball bearings 29 interspersed between the bores of the wheel hubs and the smooth outer diameter of the tubular hub extensions 24 to provide free rotation of the wheel and tire assemblies 25. The hub portions 28 of the wheels are provided with integral circular extensions 30 at their outer ends and a plurality of drilled and tapped holes radially spaced about the center of the hub at their other end through a flat face 31. These holes are adapted to receive the machine bolts or screws 32 through mating counterbored holes in the flat circular disc brake plate 33 to rigidly secure the plate to the hub portion of the wheel.

Other components of disc brakes (not shown) are usually interspersed between the rotatable plate 33 and the stationary circular flange portion 23 of the wheel hub 22. The tubular hub extension 24 is provided at its extreme outer end with a male outside threaded portion 34 over which a suitable thrust washer 35 is placed with its inner face lightly contacting the outer edge of the circular hub extension 30 and maintained in this relationship by a lock nut 36. Lock nut 36 is threaded onto the male threaded portion 34 of the stationary hub extension 24, the inner diameter portion 36' of which is enlarged to provide a shoulder 37 which together with the thrust washer 35 may be utilized to limit the lateral movement of wheel 26 between their surfaces and to removably secure the wheel and tire assembly 25 in rotative relation on the hub extension 24 of the truck beam or frame of the landing gear.

In order to install the landing wheel rotating device of the present invention in the conventional landing gear of an aircraft, it is preferred that this be accomplished by dismantling the front and rear transverse portions 13 of the truck beam or frame 11 at the respective front and rear T-shaped members 14 and 15 and splitting or dividing the T-shaped members into upper and lower sections. The lower section 14' of the front T-shaped member 14 is the only section illustrated in FIG. 3 of the drawings for purposes of illustration with the lower sections of the rear T-shaped members 15 being similar.

The lower half 38 of a transmission case or housing 39 is provided with pairs of outwardly projecting integral brackets or tabs 40 which extend into the transverse bores of the T-shaped member 14 and are secured to the internal walls thereof by means of bolts 41. The lower half 38 of housing 39 is also provided with integral lower halves of outwardly projecting bosses 42 and 43 which are in alignment with each other and located at the exact center of the transverse bores of the T-shaped member 14, and integral lower halves of outwardly projecting bosses 44 and 45. Bosses 44 and 45 are in alignment with each other and located somewhat offset from and parallel to the centers of the longitudinal bores of the T-shaped member 14. A pair of parallelly arranged webs 46 and 47 forming a part of housing 39 extend longitudinally from wall to wall within the housing and are provided with central apertures in which a pair of ball bearing races 48 and 49 are installed.

The complete transmission case or housing 39 comprises a lower half 38, described in the foregoing paragraphs, and the upper half (not shown) which is similar in most respects to the lower half. Both portions are provided with opposed mating surfaces that are adapted to be drawn into contact with each other or with a suitable gasket that may be interposed therebetween by means of bolts (not shown) that may be screwed through apertures in the upper half of the case into several threaded holes 50. These holes are properly spaced and aligned in the lower half 38 of housing 39 to form a complete dirt and dust proof case which is adapted to contain and partially support the major movable elements of the landing wheel rotating device of this invention.

Figure 2:
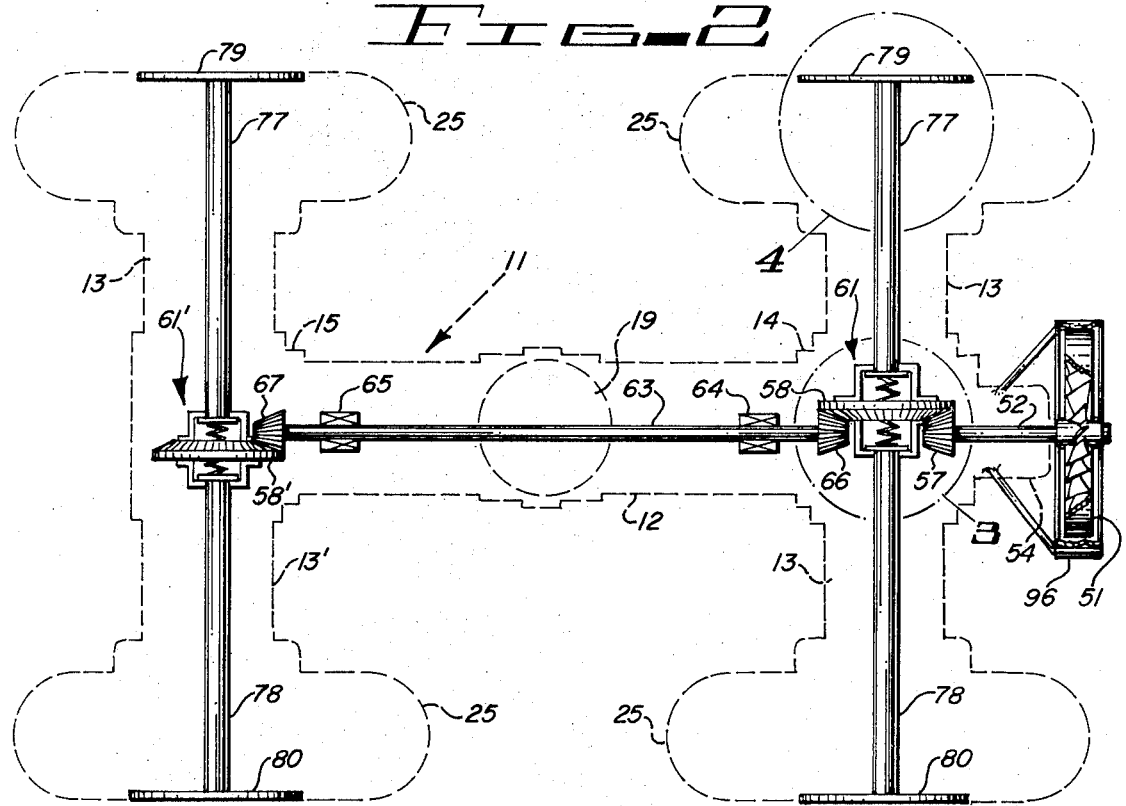
FIG. 2 is a diagrammatical plan view of the conventional landing gear shown in FIG. 1 (in dotted line) with the assembled and installed components of this invention (in full line) shown in their associated relationship.
Figure 3:
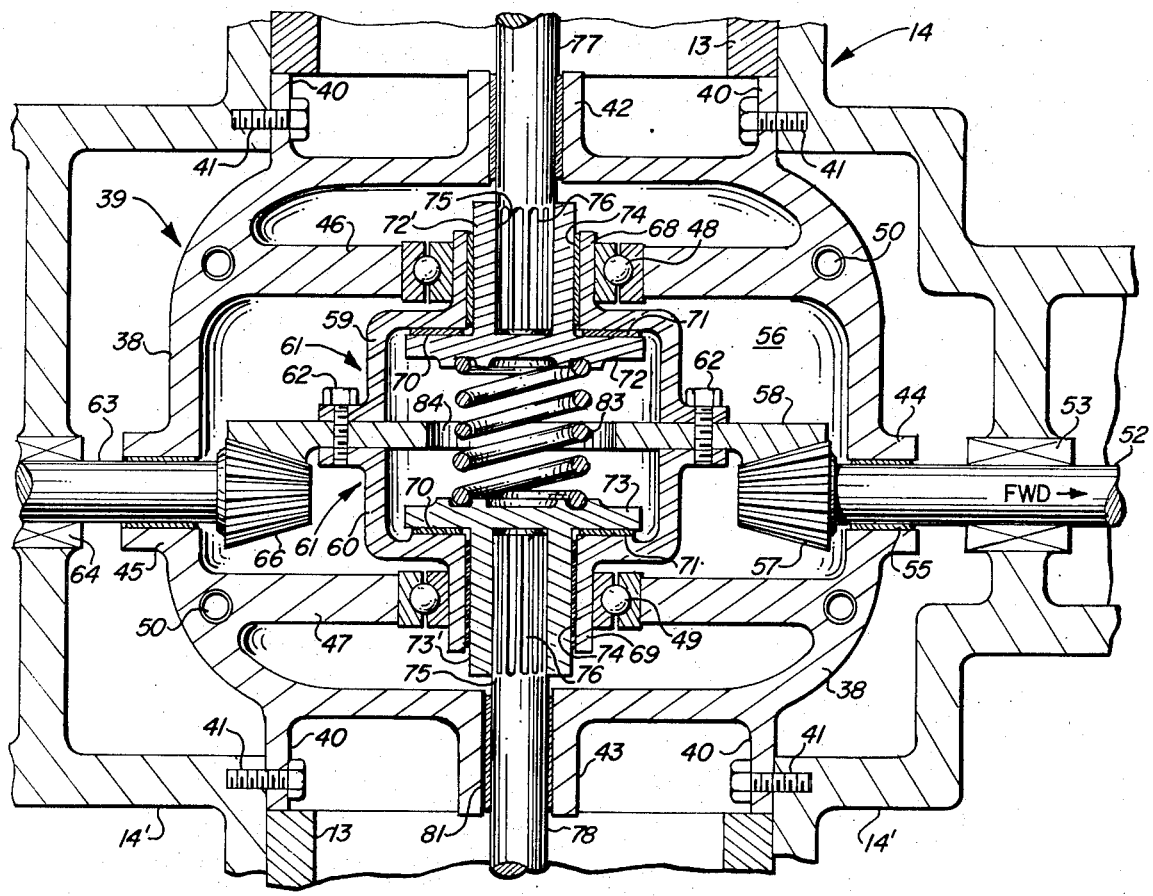
FIG. 3 is an enlarged fragmentary horizontal sectional view taken in the area indicated by the "circle 3" in FIG. 2, showing one of the slip-clutches and a portion of the drivetrain utilized in the invention.
Figure 5:
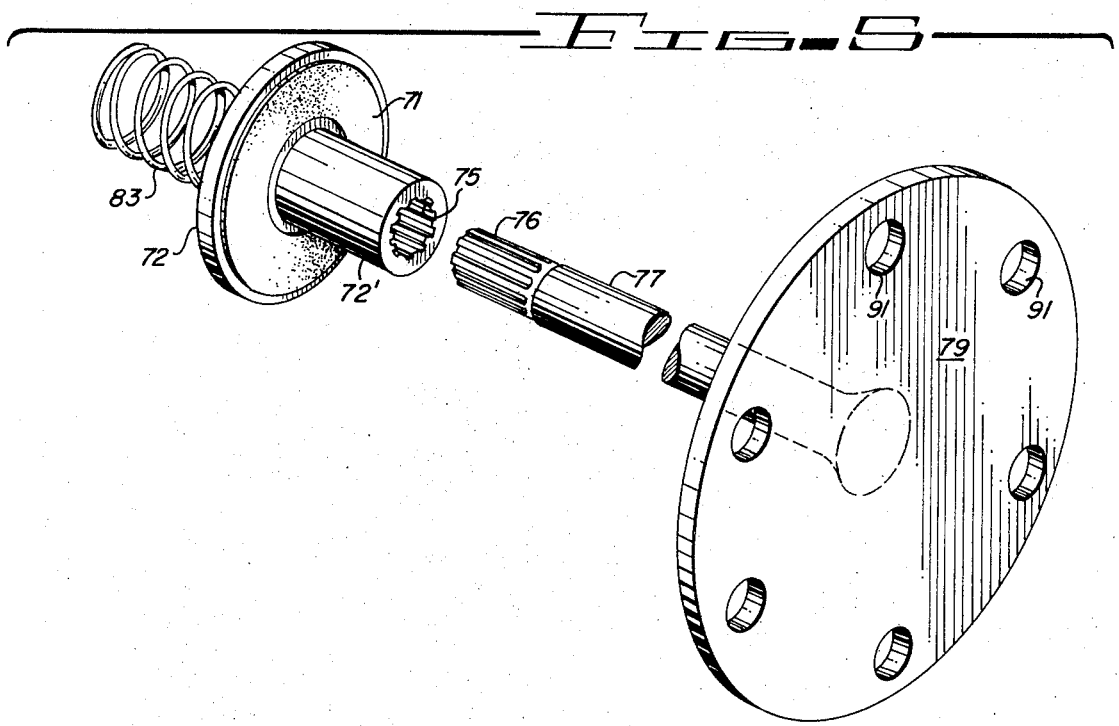
FIG. 5 is an exploded perspective view of one of the wheel driving shafts and its associated components in their respective relationship.

FIGS. 2, 3 and 4 of the drawings, illustrate one preferred method of transmitting the power or motive force required to rotate the landing wheels of the aircraft when the landing gear assemblies 10 are exposed to the airstream of the swiftly moving aircraft. The power train utilized for this purpose comprises an air pressure driven fan or impeller 51 mounted at the front end of the truck beam or frame 11 of the landing gear assemblies 10 used on the aircraft. The impeller is attached to a rotatable fan shaft 52 which is journaled in a suitable bearing mounted in the transverse wall section of the forwardly extending portion 54 of the front T-shaped member 14 through a bushing 55 mounted in the projecting lower half of boss 44, of housing 39. Shaft 52 extends into the interior or cavity 56 of the lower half of the transmission case 38 where a pinion gear 57 is removably attached thereto in driving relationship therewith.

The teeth of the pinion gear 57 are formed to mesh with laterally projecting teeth formed on one side of a ring gear 58 which in turn is mounted between the two separate halves 59 and 60, respectively, of a slip clutch housing 61. The two separate halves 59 and 60 are secured to the rotatable ring gear 58 by means of bolts 62 so that the slip clutch housing will always rotate in unison with the ring gear.

In order to transfer the rotative movement of the several elements described above to the similar elements housed in the rear T-shaped member 15 of the truck beam or frame 11, the power train is provided with a longitudinally extending drive shaft 63 which is journaled in suitable bearings 64 and 65 mounted in the front T-shaped member 14 and the rear T-shaped member 15, respectively, of the truck beam. Drive shaft 63 extends from front to rear in the interior of the longitudinal member 12 and into the cavities 56 formed in the transmission cases 39.

The longitudinal drive shaft 63 is provided at its front end with a pinion gear 66, the teeth of which are formed to mesh in driven relationship with the teeth of ring gear 58, and at its rear end with a pinion gear 67, the teeth of which are formed to mesh in driving relationship with the teeth of a similar ring gear 58', as shown in FIG. 2. This structure together with the attached slip clutch housing 61' are installed in the rear transmission case 39 (not shown) so that the teeth of the rear ring gear 58' face in the opposite direction to those of the front ring gear to impart the same clockwise direction of rotation to the rear wheel assemblies 25, as do the front wheel assemblies.

The respective half portions 59 and 60 of the slip clutch housing 61 are each provided with outwardly projecting integral tubular extensions 68 and 69, respectively. These extensions are provided with smooth outside surfaces and inside bores which open into the smooth inside circular faces 70. Faces 70 provide suitable contact surfaces for the ceramic coated inside surfaces 71 of the slip clutch driving or driven discs 72 and 73, respectively.

The tubular extensions 68 and 69 of the respective halves of the slip clutch housing 61 project into and through the opening formed by the left side bearing race 48 and likewise into and through the right side bearing race 49. Thus, they are supported in rotative relationship within the integral webs 46 and 47 of the stationary transmission case 39 where they are adapted to receive and support in rotative relationship the integral tubular extensions 72' and 73' of their respective clutch discs 72 and 73. Suitable oilite type bearings 74 are interspersed between the bores of the extensions 68 and 69 and the outer diameter surfaces of the slip clutch extensions 72' and 73' to provide free relative relationship between the described elements.

The bores of the tubular extensions 72' and 73' are provided with interior splines 75 which are adapted to mate with and receive the exterior splines 76 formed on the outer diameters of the inside end portions of the auxiliary port and starboard wheel drive shafts 77 and 78, respectively. Drive shafts 77 and 78 are provided at their extreme outer ends with flat circular plates 79 and 80 which are mounted at right angles to and concentric with the centers of the shafts and rigidly secured thereto as shown in FIG. 4. The shafts 77 and 78 are of sufficient length to extend outwardly from the inner splined bores of the tubular extensions 72' and 73' through bushings 81 in the bores of the projecting bosses 42 and 43 on the sides of the transverse frame members 13 into and through the bores 24' of the tubular hub extensions 24 and slightly beyond the ends of said extensions to their attaching points with the circular plates 79 and 80. Each of the shafts is journaled in suitable bearings 82 located in the outer and inner ends of the hub extension bores 24'.

In order to transfer the torque created by the revolving fan or impeller 51 and fan shaft 52 through pinion gear 57, ring gear 58, slip clutch housing 61 to the auxiliary drive shafts 77 and 78, a heavy duty compression spring 83 passing through a central aperture 84 in the plate portion of ring gear 58 is interposed between the opposed faces of the clutch discs 72 and 73. Spring 83 exerts sufficient pressure on discs 72 and 73 to force their ceramic coated inner faces into frictional contact with the flat, smooth surfaces 70 of the circular pads formed integral with the end walls of the rotatable slip clutch housing 61. This action causes rotation of slip clutch discs 72 and 73 and their integral extensions 72' and 73' and through the mating of their interior splines 75 and the exterior splines 76 on the respective drive shaft 77 and 78 causing rotation thereof.

In order to transfer the torque created by the rotatable drive shafts 77 and 78 to the wheel and tire assemblies 25 of the landing gear units 10 to cause the initial and continued rotation of the same whenever the fan or impeller 51 is subjected to air pressure, a partially split clamping member 85 is employed. The split clamping member has a hub portion 86 the split bore of which is provided with serrations 87. These serrations are adapted to mate with similar serrations formed on the outside diameter of the wheel hub extensions 30. The split clamping member 85 is further provided with an integral circular flange portion 88 which has a flat, smooth top surface 89. Circular plates 79 and 80 secured to the port and starboard drive shafts 77 and 78 are adapted to bear flush against surface 89 and are secured thereto by a plurality of machine bolts 90 which extend through clearance holes 91 in the circular plates 79 and 80 into mating tapped holes 92 in portion 88. Outwardly projecting lugs 93 on the split portions of hub 86 are provided with clearance holes and mating tapped holes, respectively, which are adapted to receive machine bolts 94. Bolts 94 are utilized to draw the split hub portions 86 tightly together about the serrated outside diameter of the wheel extensions 30, as shown in FIG. 4, for rotation of the landing wheels 25 by virtue of their association with the rotatable auxiliary shafts 77 and 78.

It should be pointed out and understood that the above described construction features do not in any way interfere with the removal and replacement of the wheel and tire assemblies 25 for servicing. This operation can quickly and easily be accomplished by simply loosening or removing the machine bolts 94 and then pulling the clamping member 85 with the attached circular plate 79 and the auxiliary drive shaft 77 completely out and away from the transverse frame member 13. This action allows access to and removal of the lock nut 36 and thrust washer 35, which retains the wheel in free rotative relationship on the hub extension 24, to remove the wheel. The wheel and the other described components may quickly and easily be reinstalled by simply reversing the described procedure.

Having thus described the construction and other novel features of the present invention in the foregoing paragraphs, the operation of the landing wheel rotating device of this invention will now be described.

OPERATION

Previous to putting the aircraft in the usual landing approach pattern, the pilot opens the doors of the landing gear wells or other enclosures and lowers the landing gears into their respective positions for landing. As soon as the landing gears are exposed to the airstream of the swiftly moving aircraft, the air pressure impinging on the blades of the fan or impeller 51 causes rotation of the fan and the associated elements of the power train, including ring gears 58, slip clutch housings 61, clutch discs 72 and 73, their integral extensions 72' and 73' and their associated port and starboard wheel drive shafts 77 and 78 and hence the wheel and tire assemblies 25 to which they are removably attached.

Figure 6:
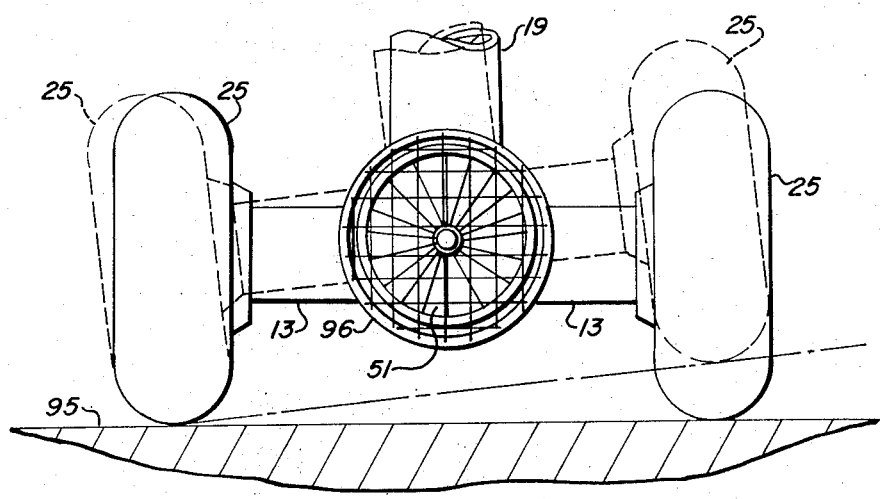
FIG. 6 is a diagrammatical front view of the aircraft landing gear shown in FIG. 1 illustrating the possible relationship of landing wheels and their tires to the surface of the landing strip or runway at touchdown.

The rotational speed of the wheel and tire assemblies 25 will be in direct proportion to the speed of the fan or impeller 51. Should this speed be lower than desired two or more fans or impellers could be connected to fan shaft 52 by suitable gearing (not shown). The landing wheels continue rotating at an approximate speed as long as the aircraft is airborne until one or more of wheels contact the frictional surface of the runway 95 as indicated in FIG. 6 of the drawings. It is evident, that the sudden impact of the tires on the runway causes a momentary slowing of the movement of the wheels contacting the runway followed by an increase in the rotational speed of all the wheels as the aircraft proceeds forward on the runway at speed up to 130 miles per hour or more. It should be understood that all of the wheel and tire assemblies 25 of the aircraft necessarily do not touch down on the runway 95 at the same precise moment and because of these various landing conditions encountered the wheels and tires of the aircraft are subject to terrific punishment and require frequent expensive servicing and replacement.

With the installation of the landing wheel rotating device of this invention, most of the above mentioned damaging results of the present landing conditions are eliminated because:

1. the wheel and tire assemblies of the several landing gears are rotating at touch down, thereby lessening the impact and consequent damage to the tires, 2. the ceramic faced slip clutches associated with each wheel and tire assembly are designed to compensate for the varying speeds of each wheel relative to the others by causing slippage or overrun of the clutch discs and other components of the system which drive and control the rotational speed of the wheels when airborne without damage to the parts of the system or severe damage or wear to the tires, and 3. the ceramic faced slip clutch discs which are associated in driving relation with each wheel and tire assembly are designed to compensate for the differences in the rotational speeds of the wheels when one or more of the tires on one side of the landing gear touch down on the runway and move forward at greater speeds without consequent damage to the aircraft's tires or the components of the wheel rotating device of this invention.

It should be apparent to those skilled in the art that although ceramic faced slip clutches are described and believed superior to other types of known slip clutches because of their ability to withstand the effects of extremely high temperatures other types of slip clutches may be used and still fall within the scope of this invention. It should also be noted that the fan or impeller 51 might be damaged by flying birds being swept into its blades and this possibility is eliminated by the installation of a suitable protective fan guard 96 around the fan.

Although but one embodiment of the invention has been shown and described, it will be apparent to those skilled in the art that various changes and modifications may be made therein without departing from the spirit of the invention or from the scope of the appended claims.

What is claimed is:

1. Landing gear for aircraft comprising in combination:
   a housing,
   an axle mounted in said housing comprising a first portion and a second portion spacedly arranged in axial alignment,
   a pair of wheels one fixedly mounted on a first end of each of said first and second portions of said axle for rotation therewith,
   a slip clutch detachably interconnecting the second juxtapositioned ends of said first and second portions of said axle, and
   means for rotating said axle prior to said axle being rotated by said wheels when the aircraft is moving along a runway,
   said means comprising an impeller rotatably connected to said slip clutch for rotating said axle and actuated by the airstream moving past said landing gear,
   said slip clutch disengaging said wheels from said means when a differential exists between their speed of rotation by the aircraft on the runway and the speed of rotation by said impeller.

2. The landing gear set forth in claim 1 wherein:
   said slip clutch comprises a housing rotatably mounted on the second juxtapositioned ends of said first and second portions of said axle, and
   means for detachably connecting said housing to said juxtapositioned ends of said first and second portions of said axle for rotation therewith,
   said means for rotating said axle being connected to said housing.

3. The landing gear set forth in claim 1 wherein:
   said housing defines a pair of friction bearing surfaces one adjacent said juxtapositioned ends of said first and second portions of said axle, and
   disc means mounted on the juxtapositioned ends of said first and second portions of said axle for frictionally engaging associated friction bearing surfaces of said housing.

4. The landing gear set forth in claim 3 in further combination with:
   spring means for biasing said disc means into engagement with said associated friction bearing surfaces of said housing.

5. The landing gear set forth in claim 4 wherein:
   said spring means comprises a coil spring coaxially arranged between said juxtapositioned second ends of said first and second portions of said axle having its ends biasing different disc means into frictional contact with their associated friction bearing surfaces of said housing.

6. The landing gear set forth in claim 1 wherein:
said impeller comprises a fan blade.

7. The landing gear set forth in claim 6 wherein:
said fan blade is covered with a cage.

8. The landing gear set forth in claim 4 wherein:
said means for rotating said axle comprises a ring gear fixedly mounted around said housing,
a second axle fixedly attached to said impeller at one end for rotation thereby and a pinion gear fixedly attached at its other end,
said pinion gear threadly connected to said ring gear for rotating said housing.

9. Landing gear for aircraft comprising in combination:
a housing,
a pair of spaced axles parallelly mounted in said housing each comprising a first portion and a second portion spacedly arranged in axial alignment, a pair of wheels for each of said axles one fixedly mounted on a first end of each of said first and second portions of each axle for rotation therewith,
a pair of slip clutches one detachably interconnecting the second juxtapositioned ends of each said first and second portions of each of said axles, and
common means for rotating said axles prior to said axles being rotated by said wheels when the aircraft is moving along a runway,
said means comprising an impeller rotatably connected to said slip clutches for rotating each of said axles and actuated by the airstream moving past said landing gear,
said slip clutches disengaging said wheels from said means when a differential exists between their speed of rotation by the aircraft on the runway and the speed of rotation by said impeller.

10. The landing gear set forth in claim 9 wherein:
each of said slip clutches comprises a housing rotatably mounted on the second juxtapositioned ends of said first and second portions of a different one of said axles,
means for detachably connecting said housings to juxtapositioned ends of said first and second portions of different axles for rotation therewith,
said means for rotating said axles being connected to each of said housings.

11. The landing gear set forth in claim 10 wherein:
each of said housings define a pair of frictional bearing surfaces one adjacent each of said juxtapositioned ends of said first and second portions of the associated axle, and
disc means mounted on the juxtapositioned ends of said first and second portions of the associated axle for frictionally engaging associated friction bearing surface of the housing.

12. The landing gear set forth in claim 11 wherein:
said means for rotating said axles comprises a ring gear fixedly mounted around each of said housings, a third axle means fixedly attached to said impeller at one end for rotation thereby and a first pinion gear fixedly attached at its other end,
said first pinion gear threadly connected to said ring gear of one of said housing for rotation thereby,
a fourth axle means,
a second pinion gear fixedly attached to one end of said fourth axle and in threaded arrangement with said ring gear of said one of said housings,
a third pinion gear fixedly mounted on the other end of said fourth axle,
said third pinion gear being in threaded engagement with said ring gear of said other housing for rotating said other housing upon rotation of said first housing.

13. A method of rotating the wheels of an aircraft during a landing approach comprising the steps of:
rotating an impeller mounted on the landing gear of the aircraft by the airstream flowing past the landing gear,
rotatably connecting the impeller to at least two of the wheels of the aircraft while the wheels are airborne during a landing approach, and
disconnecting the wheels from the impeller upon the wheels touching the ground.

14. The method of rotating the wheels of an aircraft as set forth in claim 13 in further combination with the step of:
sequentially disconnecting the wheels of the aircraft from the impeller when the wheels sequentially touch the ground.

15. The method of rotating the wheels of an aircraft as set forth in claim 13 in further combination with the step of:
rotatably connecting the impeller to at least two pairs of wheels of the aircraft.

16. The method of rotating the wheels of an aircraft as set forth in claim 13 wherein:
the impeller is detachably and rotatably connected to the wheels of the aircraft.

17. The method of rotating the wheels of an aircraft as set forth in claim 13 wherein:
the impeller is rotatably connected to two wheels on a common shaft of the landing gear to rotate them in unison while the wheels are airborne during a landing approach.

18. The method of rotating the wheels of an aircraft as set forth in claim 13 in further combination with the step of:
rotating at least two impellers mounted on the landing gear of the aircraft, and
rotatably connecting said impellers to at least two of the wheels of the aircraft.

* * * * *